Aug. 12, 1924.  1,504,622

R. E. HELLMUND

SYSTEM OF VENTILATION

Filed June 9, 1920

WITNESSES:

INVENTOR
Rudolf E. Hellmund
BY
ATTORNEY

Patented Aug. 12, 1924.

1,504,622

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

SYSTEM OF VENTILATION.

Application filed June 9, 1920. Serial No. 387,560.

*To all whom it may concern:*

Be it known that I, RUDOLF E. HELLMUND, a citizen of the United States, and a resident of Swissvale, in the county of Allegheny and State of Pennsylvania, have invented a new and useful Improvement in Systems of Ventilation, of which the following is a specification.

My inventon relates to systems of ventilation for dynamo-electric machines and it has particular relation to the ventilation of dynamo-electric machines which have relatively large air gaps between their stationary and their rotating members, such, for example, as turbo-generators.

The object of my invention is to provide means for causing the cooling air within the air gap to move in a substantially longitudinal direction therethrough at all times. Also that this means shall be relatively inexpensive to construct, of great durability, that it shall be easily repaired and shall not affect adversely the operating characteristics of the machine.

Heretofore, in the manufacture of dynamo-electric machines, it has been customary to mount fans on the rotor shafts to drive cooling air through the annular openings or air gaps between the stators and the rotors thereof. When the air gap between the rotor and the stator was relatively large a thin layer of heated air covered the surface of the rotor and rotated therewith. This film of air became a heat insulator and prevented the cooling air from coming into effective contact with the rotor.

By my invention, I provide means which prevent the formation of a rotating film of air. Briefly speaking, my invention consists of placing a plurality of substantially longitudinally extending barriers or deflectors which project within a comparatively short distance of the surface of the rotor, removing the thin film of air which rotates therewith.

These barriers may be portions of the slot wedges in the stator of the machine, if desired.

For a better understanding of my invention, reference may now be had to the accompanying drawings, Fig. 1 of which is a view, partially in end elevation and partially in section, of a portion of a stator and a rotor of a dynamo-electric machine, the stator of which is provided with barriers for air constructed in accordance with my invention. For the sake of clearness, a stator winding is shown in only one slot of the core.

Figure 1:
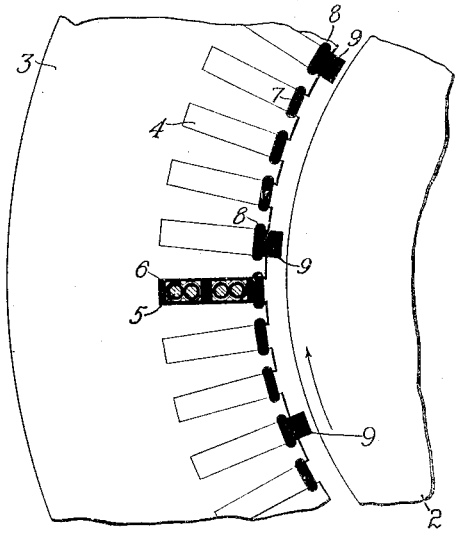
Figure 2:
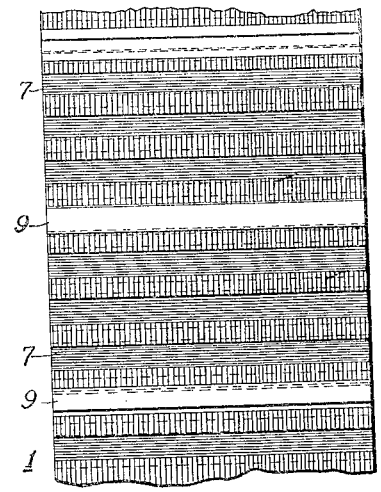
Fig. 2 is a view, in side elevation, of the stator shown in Fig. 1, taken along its inner circumference.

Referring particularly to Figs. 1 and 2, a relatively large air gap is shown between the stator 1 and a rotor 2 of a dynamo-electric machine. The stator 1 comprises a core member 3, provided with a plurality of slots 4, in which a winding 5 is disposed. The winding 5, which, for clearness, has been shown in only one of the slots 4, is insulated from the core member 3 by layers of insulating material 6 and is maintained within the slots 4 by means of wedges 7. The wedges 7 may be made of some suitable insulating material, such, for example, as micarta, and are retained in position by means of notches or grooves 8 in the walls of the slots 4.

Certain of the wedges 7, regularly spaced about the inner circumference of the stator, are provided with inwardly extending projections 9, which serve as barriers or deflectors for the air which tends to rotate with the rotor. The barriers 9 may, if desired, be independent of the wedges. These barriers extend relatively close to the rotor 2 and remove the thin film of air which tends to rotate with the rotor 2.

Figure 3:
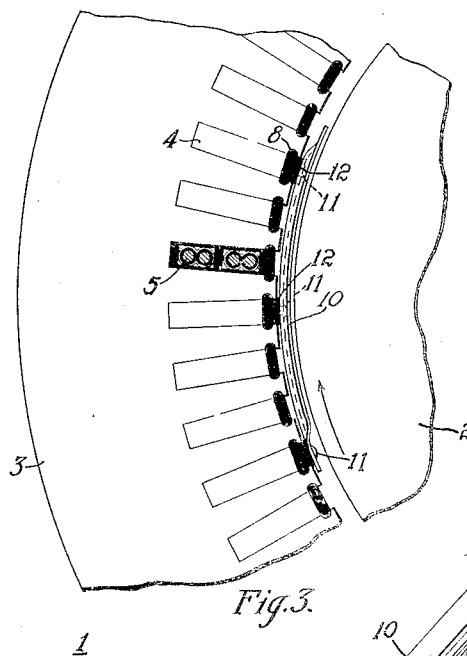
Fig. 3 is a view, partially in end elevation and partly in section, of a portion of a stator and a rotor of a dynamo-electric machine, the stator of which is provided with barriers of a modified form, constructed in accordance with my invention.
Figure 4:
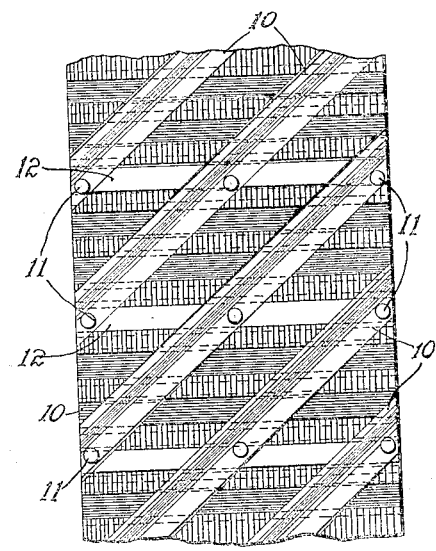
Fig. 4 is a view, in side elevation, of the stator shown in Fig. 3, taken along its inner circumference.

Figs. 3 and 4 are views similar to Figs. 1 and 2, of another form which my invention may assume. In this form of my invention, barriers 10 are provided on the inner circumference of the stator which are skewed with respect to the slots. The most desirable angle of skewing would depend upon the speed of the machine. For the sake of clearness, only one barrier is shown in Fig. 3. The barriers 10 are composed of some non-magnetizable metal, such, for example, as brass and are held in position by means of bolts or rivets 11, which pass through certain of the slot wedges. Each of the wedges to which the barriers are attached is provided with a raised portion 12 which serves to raise the barrier slightly above the ends of the core teeth. This eliminates the possibility of the barrier in any way increasing the eddy-current losses of the stator core.

Figure 5:
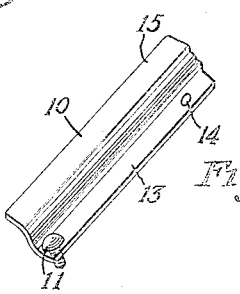
Fig. 5 is a view, in perspective, of a portion of one of the barriers shown in Figs. 3 and 4.

The shape of the barrier 10 is best shown in Fig. 5. The barrier 10 may be made of pressed metal and is uniform throughout its entire length. It consists of a flat portion 13 provided with holes 14 through which the bolts or rivets extend and a bent lip portion 15 which extends relatively close to the rotor 2.

When the machine is in operation, the barriers being in close proximity to the relatively movable rotor, project into the path of any air which tends to move with the rotor. Furthermore the cool air, which is being forced through the air gap in a longitudinal direction, is forced into engagement with the surface of the rotor by means of the deflectors.

An advantage of the skewed barrier is that it diverts the air gradually from the surface of the rotor, but it is of more difficult construction than the simplified form in Figs. 1 and 2.

From the foregoing description, it will be apparent to those skilled in the art that, by my invention, I provide a structure which will prevent a thin film of heated air from being rotated with the surface of the rotor. Also, that it will deflect a current of cooling air thereagainst and is relatively simple and inexpensive to manufacture.

While I have shown two forms of my invention, it is apparent that minor modifications may be made without departing from the spirit thereof; therefore, I desire to be limited only by the scope of the appended claims.

I claim as my invention:—

1. In a dynamo-electric machine, the combination with a rotor, of a stator provided with a core member having a slot therein, a wedge in said slot and an insulated barrier member mounted in said core member by means of said wedge and projecting toward said rotor for directing cooling air against said rotor and removing heated air therefrom throughout substantially the entire length thereof.

2. In a dynamo-electric machine, the combination with a rotor, a stator provided with a core member having a slot therein and a winding positioned in said slot, of means for retaining said winding in said slot and a plurality of barriers secured to said retaining means and extending transversely to the direction of rotation of said rotor for deflecting cooling air against said rotor and removing heated air therefrom.

3. In a dynamo-electric machine, the combination with a rotor, a stator provided with a core member having a plurality of slots therein and a winding positioned in said slots, of a plurality of insulated wedges so disposed as to retain said winding in said slots and a plurality of barriers secured to said wedges which project relatively close to the surface of said rotor for removing heated air therefrom.

4. A dynamo-electric machine comprising rotor and stator members separated by an air gap, and a skewed barrier disposed in said air gap.

5. In a dynamo-electric machine, the combination with a rotor, of a stator provided with a barrier for directing cooling air against said rotor and heated air therefrom, said barrier being disposed in skewed relation with respect to the direction of rotation of said rotor.

6. In a dynamo-electric machine, the combination with a rotor, a stator provided with a core member having slots, a winding mounted in said slots, and a wedge for maintaining said winding in said slots, of a barrier for air mounted on said core member by means of said wedge and disposed in angular relation with the surface of said rotor.

7. A dynamo-electric machine comprising stator and rotor members separated by an air gap, one of said members being provided with a core portion having slots, a winding mounted in said slots, wedges for retaining said winding in said slots, and a skewed barrier secured to said wedges in spaced relation to said core portion.

8. A dynamo-electric machine comprising stator and rotor members separated by an air gap, said stator member being provided with a core portion having slots, a winding mounted in said slots, wedges for retaining said winding in said slots, and a skewed barrier secured to said wedges in spaced relation to said core portion.

In testimony whereof, I have hereunto subscribed my name this 1st day of June, 1920.

RUDOLF E. HELLMUND.